Sept. 7, 1965          E. P. MANNING          3,204,898
ADJUSTABLE SUPPORT
Filed Feb. 17, 1964

EUGENE P. MANNING,
INVENTOR.

BY

BUCKHORN, BLORE, KLARQUIST & SPARKMAN,
ATTORNEYS

United States Patent Office 3,204,898
Patented Sept. 7, 1965

3,204,898
ADJUSTABLE SUPPORT
Eugene P. Manning, Gresham, Oreg., assignor to Product Engineering Company, Portland, Oreg., a corporation of Oregon
Filed Feb. 17, 1964, Ser. No. 345,333
2 Claims. (Cl. 248—44)

This invention relates to an adjustable support, and more particularly to a universally adjustable support.

In fixtures, such as, for example, handrails for boats, steps and sidewalks, posts or other supporting members are fixed to supports which in turn are fastened to supporting surfaces such as the boat deck, wall or sidewalk as the case might be. Such supporting members seldom are normal to the supporting surfaces to which the supports are fastened, and, as a result, shimming or like methods are used to position the supports on the supporting surfaces so that the holders of the supports fastened to the supporting members are aligned with the supporting members. Such shimming and the like is difficult and time consuming, and also detracts from the appearance. Since the angles of the supporting members relative to the supporting surfaces vary at different portions in each installation and different supporting surfaces for different installations vary one from another, it is impractical to have sufficiently different numbers of supports with the varied angles of the holders to the bases thereof to eliminate such shimming. It would be desirable to provide a support in which the holder thereof is adjustable relative to the base to obtain the desired angle therebetween, thereby eliminating shimming. However, the holder must be locked rigidly to the bases to provide strength, and no adjustable supports of the prior art have been satisfactory in this regard.

An object of the invention is to provide an adjustable support.

Another object of the invention is to provide a universally adjustable support.

A further object of the invention is to provide an adjustable support which has a holder universally adjustable within limits relative to a base and locking means for rigidly locking the holder to the base in adjusted position relative thereto.

Another object of the invention is to provide an adjustable support having a socket member and a base member adjustable relative to one another, together with simple, rugged, easily released, easily tightened locking structure for holding the socket member in adjusted position relative to the base.

The invention provides an adjustable support including a holder for holding a supporting member and having a spherical socket portion universally mounted on a spherical surface of a base which is adapted to be secured to a supporting surface. Preferably the holder has a centrally located bore extending longitudinally therethrough aligned with a cylindrical socket, and a capscrew extends through the bore and also extends through a large slot in the base to permit adjustment of the holder relative to the base. A lock nut threaded on the lower end of the capscrew has a sharp edge portion adapted to bite into the lower cylindrical surface of the dome of the base and lock the holder rigidly to the base in adjusted position thereon. Preferably the lock nut is composed of a material harder than that of the base so that the sharp edge portion of the lock nut will dig into the softer material of the base for locking the two together.

A complete understanding of the invention may be obtained from the following detailed description of an adjustable support forming a specific embodiment thereof, when read in conjunction with the appended drawings, in which.

Figure 1:
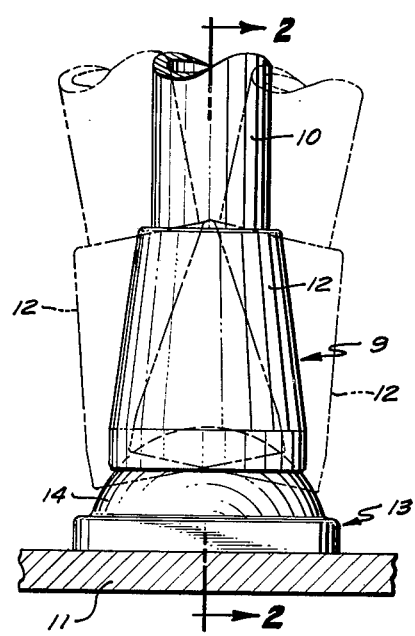
FIG. 1 is a front elevation view of an adjustable support forming one embodiment of the invention.
Figure 2:
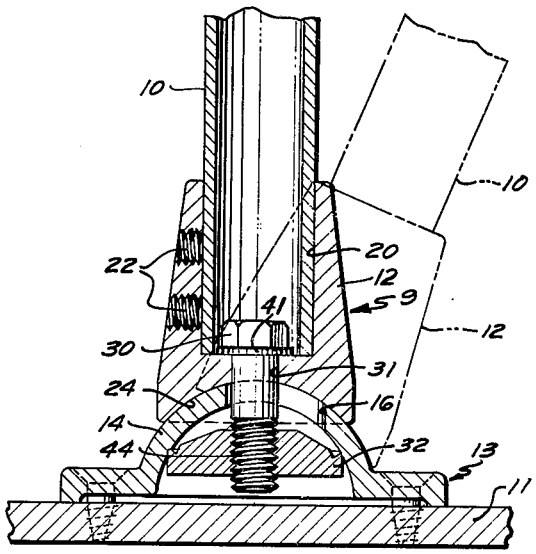
FIG. 2 is a fragmentary, vertical section taken substantially along line 2—2 of FIG. 1.
Figure 3:
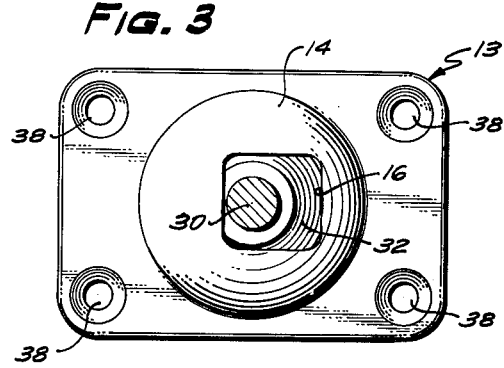
FIG. 3 is a top plan view of a base of the adjustable support of FIG. 1 with a capscrew thereof shown in section.
Figure 4:
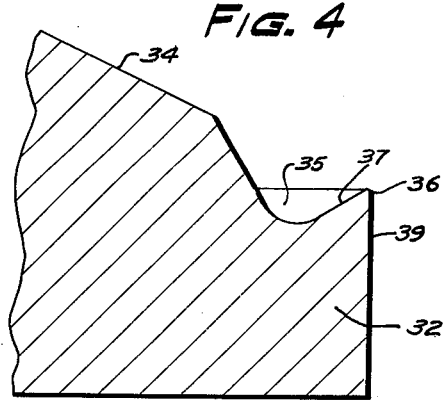
FIG. 4 is an enlarged, fragmentary vertical section of a lock nut of the adjustable support of FIG. 1.
Figure 5:
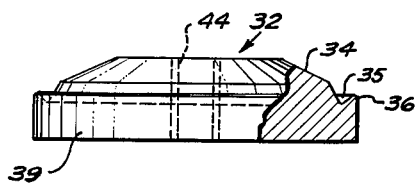
FIG. 5 is a side elevation view of the lock nut of FIG. 4 with a portion thereof shown in section.

Referring now in detail to the drawings, there is shown therein an adjustable support 9 mounted on a supporting surface 11, which may be, for example, the deck of a boat. The support may be adjusted to permit a vertical tubular post or supporting member 10 held by a socket or tubular holder 12 to be tilted at any desired position relative to the base 13 from the vertical to about 22° in a first direction relative to the vertical. The holder 12 also may be adjusted to provide for about a 12° range of adjustment on each side of the vertical and transverse to the adjustment in the first direction. The base includes a spherical dome 14 having a clearance slot 16 therein to permit adjustment of the holder 12 relative to the base 13. The holder has a connecting portion, which, in the embodiment shown, comprises the tubular portion thereof, which has a cylindrical socket or counterbore 20 for receiving the post 10 in close fitting engagement. The post 10 is locked in position by setscrews 22. The holder has a spherical recess or socket 24 complementary to the exterior surface of the spherical dome 14 of the base 13.

To lock the holder 12 in the desired adjusted position, a capscrew or bolt 30, which extends slidably through a close fitting bore 31 aligned with the counterbore 20, is threaded into a locking nut 32. The nut 32 has a frustoconical upper surface 34, and also has a sharp, acute angle, cutting edge 36 formed at the juncture of a frustoconical surface 37 of a groove 35 and cylindrical periphery 39 of the nut. The surface 37 may join the periphery 39 directly, or, for greater strength, the edge 36 may be in the form of a very narrow land of a width of a few thousandths of an inch. In one constructed embodiment of the adjustable support, the angle between the surface 34 and the periphery 39 was about 115°, and the angle of the edge 36 measured between the surface 37 and the periphery 39 was about 60°. When the capscrew is threaded tightly into the nut 32, the edge 36 bites into the spherical portion 14 of the base to lock the nut 32 against rotation and rigidly hold the holder in the desired adjusted position relative to the base. The nut 32 preferably is made of harder metal than the base 13 so that the edge 36 bites into the base. The nut 32 preferably is composed of stainless steel and the capscrew 30 also is preferred to be of this material. A lock washer 41 of the serrated edge type is positioned under the head of the screw. The base 13 and the holder 12 preferably are composed of brass or other corrosion-resistant alloy, and are chrome plated. The base has countersunk holes 38 for screws to fasten the base to the deck 11.

The capscrew can be threaded into and out of the nut 32 by starting the screw therein, pulling the holder 12 upwardly to pull the sharp edge 36 against the bottom of the dome 14 and screwing the capscrew into the nut with the aid of a socket wrench (not shown) extending into the counterbore 20. The edge 36 bites into the dome and locks the nut against turning relative to the dome. Any lateral force applied to the portion of the post 10 above the holder 12 tends to pivot the holder 12, the capscrew 30 and the locking nut 32 about a fulcrum point at the portion of the bottom of the holder at the outer edge of the recess 24 on the side of the holder toward which the force tends to move the post. This tends to raise the portion of the sharp edge 36 at the side of the capscrew opposite from that of the fulcrum point, and this portion of the sharp edge 36 cuts farther into the dome to prevent movement of the holder 12 relative to the base 13. Due to the sharp edge 36, the strong locking action of the nut occurs even if the nut is merely snugged up against the dome 14.

The diameter of the nut 32 is somewhat less than that of the lower portion of the holder 12 so that the holder backs up or supports the dome 14. The holder is tapered from its lower portion upwardly. The nut has a long threaded portion 44 since the nut is much thicker at the central portion thereof than at the periphery. However, the frustoconical surface 34 is sufficiently flat that it does not engage the bottom of the dome except at the edge 36.

The holder 12 is adjustable through infinitesimal increments to any angle desired relative to the base, and this is effected easily. The lock nut 32 rigidly holds the holder 12 in adjusted position, and the adjustable support is very rugged and strong while including a minimum number of parts. The adjustable support is excellently suited for use whereever adjustment and rigidity are required, and may be use, for example, as a boat stanchion, a flagpole support, or as a support for a handrail.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an adjustable support,
a base having a base flange and a central, spherical dome portion having a slot therethrough,
a holder having a post-receiving counterbore in one end thereof, a spherical socket in the other end thereof and a bore extending from the central portion of the counterbore to the socket,
a capscrew having a head in the counterbore and a shank extending through the bore and the slot,
and a disc-like locking nut having a frustoconical surface adjacent the dome portion and also having an annular groove near the periphery thereof opening into the frustoconical surface and providing a sharp, peripheral edge adapted to bite into the dome portion.

2. In an adjustable support,
a generally tubular holder having an elongated counterbore in one end thereof and a short bore in the other end thereof and tapering from a predetermined external diameter at said one end thereof to a substantially larger diameter at said other end thereof,
the holder also being provided with a spherical socket at said other end thereof,
a base having an outer flange adapted to be secured to a deck and a central, spherical, dome portion having an adjustment slot therethrough,
a bolt extending through the bore and the slot, and a nut on the bolt and positioned in the dome portion and having a sharp edge portion biting into the dome portion,
the nut having a cylindrical periphery, a generally frustoconical surface at the end thereof adjacent the dome and having a groove in the portion thereof adjacent the dome portion and adjacent the periphery thereof to form the sharp edge at the end of the cylindrical periphery adjacent the frustoconical surface.

References Cited by the Examiner

UNITED STATES PATENTS

| | | | |
|---|---|---|---|
| 2,265,792 | 12/41 | Allen | 240—68 |
| 2,456,480 | 12/48 | Austin | 248—351 |
| 2,634,935 | 4/53 | Carpenter | 248—181 |
| 2,641,513 | 6/53 | Fryda | 306—10 X |
| 2,922,609 | 1/60 | Collier | 248—179 |
| 2,983,534 | 5/61 | Heller et al. | 151—35 |
| 3,053,355 | 9/62 | Attwood | 151—37 X |

CLAUDE A. LE ROY, *Primary Examiner.*

FRANK L. ABBOTT, *Examiner.*